May 29, 1923.

E. B. BIRCH 1,457,052

SYSTEM OF ELECTRICAL DISTRIBUTION

Filed June 25, 1921

7 Sheets-Sheet 5

INVENTOR
E. B. Birch
by F. N. Barber
his attorney

May 29, 1923.

E. B. BIRCH 1,457,052

SYSTEM OF ELECTRICAL DISTRIBUTION

Filed June 25, 1921

7 Sheets-Sheet 6

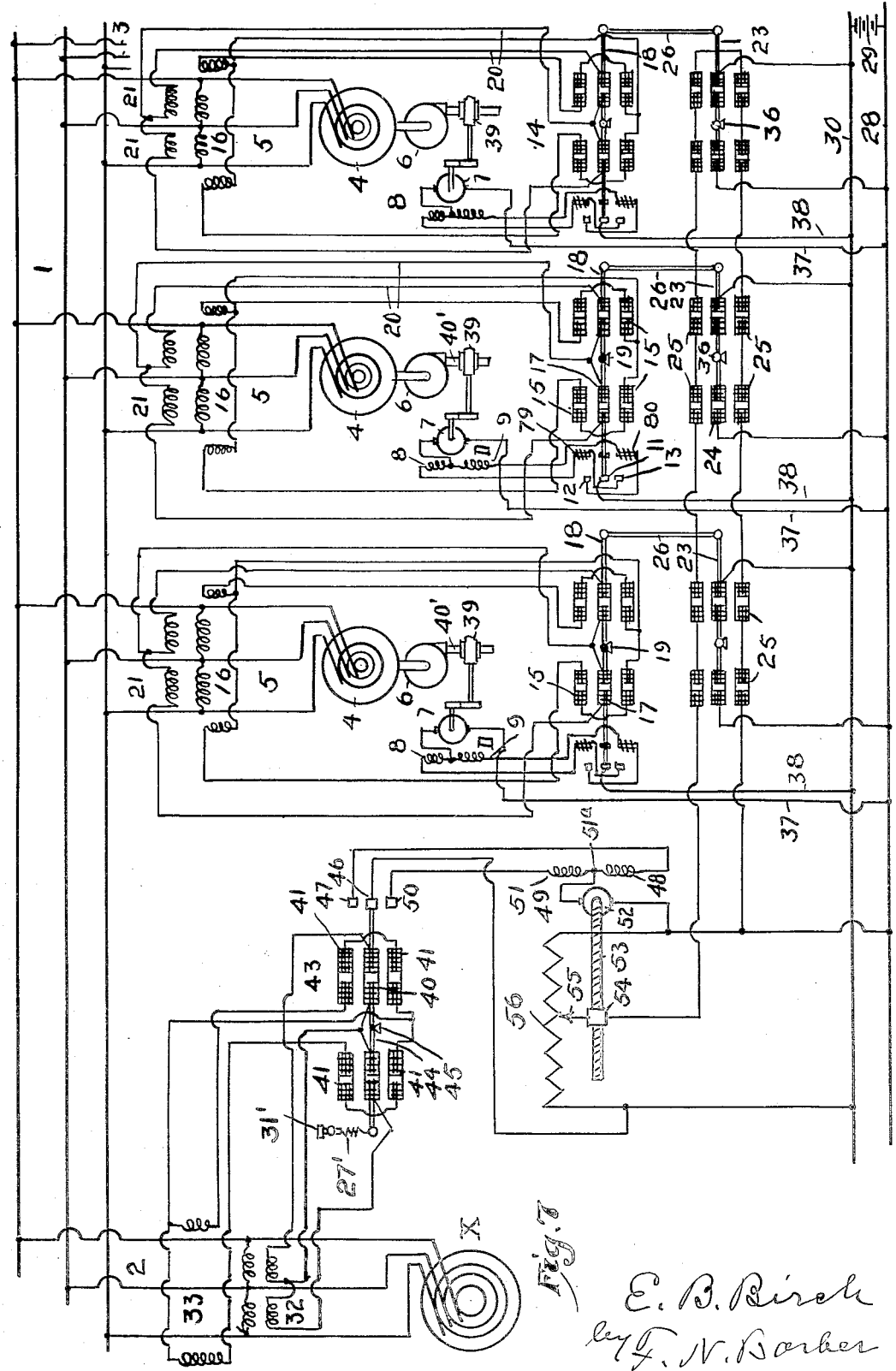

Patented May 29, 1923.                                                               1,457,052

UNITED STATES PATENT OFFICE.

EZEKIEL B. BIRCH, OF PITTSBURGH, PENNSYLVANIA.

SYSTEM OF ELECTRICAL DISTRIBUTION.

Application filed June 25, 1921. Serial No. 480,344.

*To all whom it may concern:*

Be it known that I, EZEKIEL B. BIRCH, a citizen of the United States, residing at Pittsburgh, in the county of Allegheny and State of Pennsylvania, have invented new and useful Improvements in Systems of Electrical Distribution, of which the following is a specification.

My invention relates to systems of electrical distribution supplied by current from two sources of supply. One of the sources, called the main source of supply, is intended to feed into the service lines a substantially constant or normal load or value of current, while one or more auxiliary sources of current supply serve as emergency units to supplement deficiencies in the supply from the main source, and to feed into the service lines such excess of current as they may demand above the said intended constant or normal load from the main source of supply. It is the object of this invention to produce an improved system of the type just described, wherein the auxiliary sources will act to maintain a substantially constant load on the incoming transmission lines from the main source of current supply, and also to avoid unequal division of loads among the auxiliary current-generating units. It is an object of this invention to provide means whereby the output of the auxiliary source is made substantially equal to the difference between a predetermined, constant, or normal load taken from the main source of current and the total load taken by the service lines. It is also an object to provide an efficient anti-hunting means for the regulators of the auxiliary generators. Other objects appear hereinafter.

Figure 1:
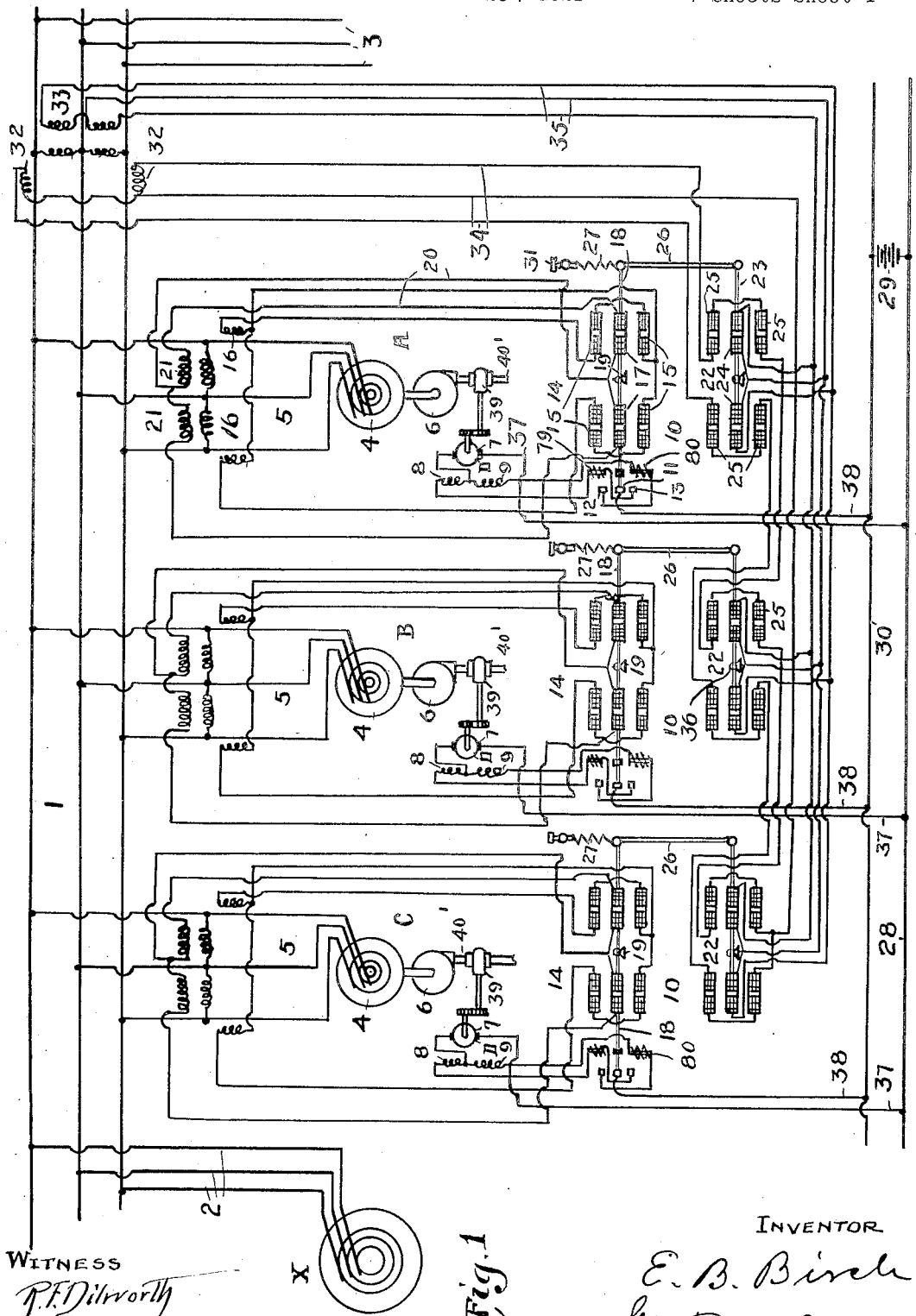

Referring to the accompanying drawings, Fig. 1 shows diagrammatically an electrical distribution system embodying one species of my invention. Figs. 2 to 7 each show diagrammatically a different modification of my invention.

Referring first to Fig. 1, which shows my invention applied to a three-wire alternating-current system, 1 designates, for example, a set of bus-bars in a local station. The incoming transmission lines 2 from the main source X of current supply and the service lines 3 are connected to the bus-bars, to which the local generator units A, B, and C are connected. Each unit has a generator 4 connected to the bus-bars by the wires 5 and driven by a prime mover 6 of any suitable type, shown diagrammatically as a turbine steam engine whose steam-inlet is controlled in any suitable manner by an electric motor D having the armature 7 adapted to run in one direction or the opposite direction according to which of its fields 8 and 9 is energized.

Each generator unit has an electric controlling means 10 preferably of identical construction and function. The several corresponding parts of the said units have corresponding reference numerals. I will describe the controlling means for the unit A and then describe the connections between the units.

The unit A has two controlling devices 14 and 22, which I have shown, as an example, in the form of balances of the Kelvin type, the position of whose movable element is controlled by the amount of current flow in the balances. In the upper balance I employ a movable contact, or switch member, 11 adapted to engage the fixed contact 12 connected to one end of the field winding 9, or to the fixed contact 13 connected to one end of the field winding 8. The remaining ends of the field windings are connected to one pole of the armature of the motor 7. The other pole of the armature is connected by the wire 37 to the wire 28 leading to one side of a source 29 of direct current, the other side of the source 29 being connected by the wire 30 to the wire 38, to which the switch member 11 is connected.

The balance 14 has the usual four stationary windings 15, a pair at each end thereof. One end pair is in series with one transformer 16 and the other end pair is in series with the other transformer 16, the transformers being energized by current in the auxiliary transmission wires 5. The bottom members of each pair are connected by a return wire to the transformers. The balance has the usual two windings 17 carried by the movable balance member 18, to which the movable switch member 11 is attached.

The member 18 has the fulcrum 19 between the windings 17, which are connected by the wires 20 to the transformers 21 energized by current in the said wires 5. Thus, the balance 14 so far as now described is controlled by current which the generator 4 feeds to the bus-bars 1 and, consequently, to the service lines 3.

The lower balance 22 has the same construction as the balance 14, and has its movable member 23, which carries the windings 24, controlled by the stationary windings 25. The movable members of the two balances are mechanically connected together by the rigid link 26, which is attached to the end of the member 18 opposite that which supports the contact 11. A spring 27, whose tension is adjustable by the screw 31 or otherwise, exerts an up-pull on the right-hand end of the member 18.

The stationary windings 25 are, through the wires 34, supplied by current from the transformers 32 energized by the total current transmitted by both the main and the auxiliary sources of current supply to the service lines 3. The movable windings 24 receive through the wires 35 current from the transformers 33, which like the transformers 32, are energized by a fractional part of all the current passing from the bus-bars 1, that is, from both sources of current, to the service lines 3. 36 designates the fulcrum of the member 23.

The wires 37 and 38 of the units B and C are connected respectively to the wires 28 and 30. All the stationary pairs of windings 25 at one end of each balance 22 in the units A, B, and C are connected by the right hand wire 34 in series with one of the transformers 32, and all the stationary pairs at the other end of each balance 22 are connected by the left hand wire 34 in series with the other transformer 32, the transformers 32 being connected to the bus-bars 1 at points through which all the current from both sources travel. The middle wire 34 is the return wire connecting the transformers 32 with points between the bottom members of each pair of stationary balances 22. The wires 35 are continued past the unit A and the movable windings 24 of the units B and C are connected thereto as the windings 24 of the unit A are connected thereto.

Current through the balances 22 produces down-pulls on the links 26, and when the incoming lines are furnishing their normal or predetermined amount of current and the demands of the service lines 3 are fully met by that amount of current, the down-pulls of the balances 22 on the links 26 are balanced by the up-pulls of the springs 27 and the balances 14, and the contacts 11 are maintained out of engagement with the contacts 12 and 13.

If the demands on the service lines 3 increase, the increase of current from the lines 2 through the transformers 32 and 33 causes the lower balances 22 to swing the movable members 23 so as to pull down with increased force on the links 26, which in turn stretch the springs 27 and cause the contacts 11 to engage the contacts 12, thereby permitting current from the source 29 to energize the field windings 9 and the armatures 7 of the motors D. The current through the motors D causes their armatures to rotate and operate the valve 39 in the pipes 40' to supply more steam to the turbines 6, which thereupon cause the power developed by the turbines to increase and cause the generators 4 to deliver more current to the bus bars 1. This increased current causes the transformers 16 and 21 to deliver more current to the balances 14 which produce increased up-pulls on the right hand ends of their movable members 18. The governor motors D continue to rotate until the up-pulls of the balances 14 and the springs 27 overcome the down-pulls of the balances 22, at which time the contacts 11 and 12 are opened and the motors D stop, the generators then delivering a constant input to the bus bars 1. The total output of the generators of the units A, B, and C is now equal to the excess load drawn from the feeders or service lines 3, and the incoming current from the source X is reduced to its normal or predetermined value.

In case a further increase of current is required by the service lines, the balances 22 will again cause the contacts 11 to engage the contacts 12, thereby setting the motors D in operation to open the valves 39 still more. This increases the output of the generators 4 until the down-pulls of the balances 22 again exceed the up-pulls of the balances 14 and the springs 27, at which time the contacts 11 and 12 open and stop the motors D, and the output of the generator units A, B, and C equals the excess of the demands of the service lines over the normal supply from the lines 2.

In case the current taken by the service lines 3 decreases, the down-pulls of the balances 22 decrease, thereby permitting the balances 14 and the springs 27 to operate the members 18 so as to make the contacts 11 engage the contacts 13, whereupon the motors D are energized, but the reversing fields 8 are now energized, causing the said motors to rotate in the direction to move the valves 39 toward closing position. When the output of the turbines is thereby decreased so that the up-pulls of the balances 14 have decreased enough to allow the balances 22 to overcome the tension of the springs 27, the contacts 11 and 13 open and the generators 4 have a lower output at which the power supplied by the lines 2 again becomes normal.

Obviously the loads which the several generators carry may be adjusted by changing the tension of the springs 27 so that each generator 4 may impress a predetermined amount of current on the bus-bars 1.

Each balance 14 is preferably provided with an anti-hunting means, comprising the electromagnets 79 and 80, the former being arranged above the member 18 and the latter below the same so as to exert opposite influences on the member 18. The winding of the upper magnet 79 is in series with the field 8 and the lower contact 13, and the winding of the lower magnet is in series with the field 9 and the upper contact 12. Assume that the contacts 11 and 12 are closed so that the generators 4 are increasing their output. The windings of the magnets 80 then exert down-pulls on the contacts 11 tending to open the contacts 11 and 12. If the increase of load on the service lines is large, the motors D run at considerable speed, and overtravel when the contacts 11 and 12 open, and would cause the balances 14 to close the contacts 11 and 13, if the magnet 80 were not present. This magnet which adds its contact-opening effect to that of the balances 14 causes the contacts 11 and 12 to open somewhat in advance of the instant when equilibrium is reached, that is, when the generators 4 have exactly put into the service lines the amount of power they demand above the predetermined supply from the main generator X. The interval of said advance is determined by the construction or adjustment of the magnets 80, and can be adjusted or made to have such a strength as to exactly allow for the inertia or drift of the motors D. If the contacts 11 and 13 are closed, the magnets 79 would act to prevent the hunting of the contacts 11 in the manner just described with respect to the magnets 80.

If the change of load conditions is small, the contacts 11 will close on the contacts 12 or 13, but will be quickly pulled away therefrom by the anti-hunting magnets, thus giving slight impulses to the governor motors D. If the impulses are not sufficient to establish equilibrium, the contacts re-engage, giving another impulse to the motors. These impulses continue until equilibrium of the balances is established.

Figure 2:
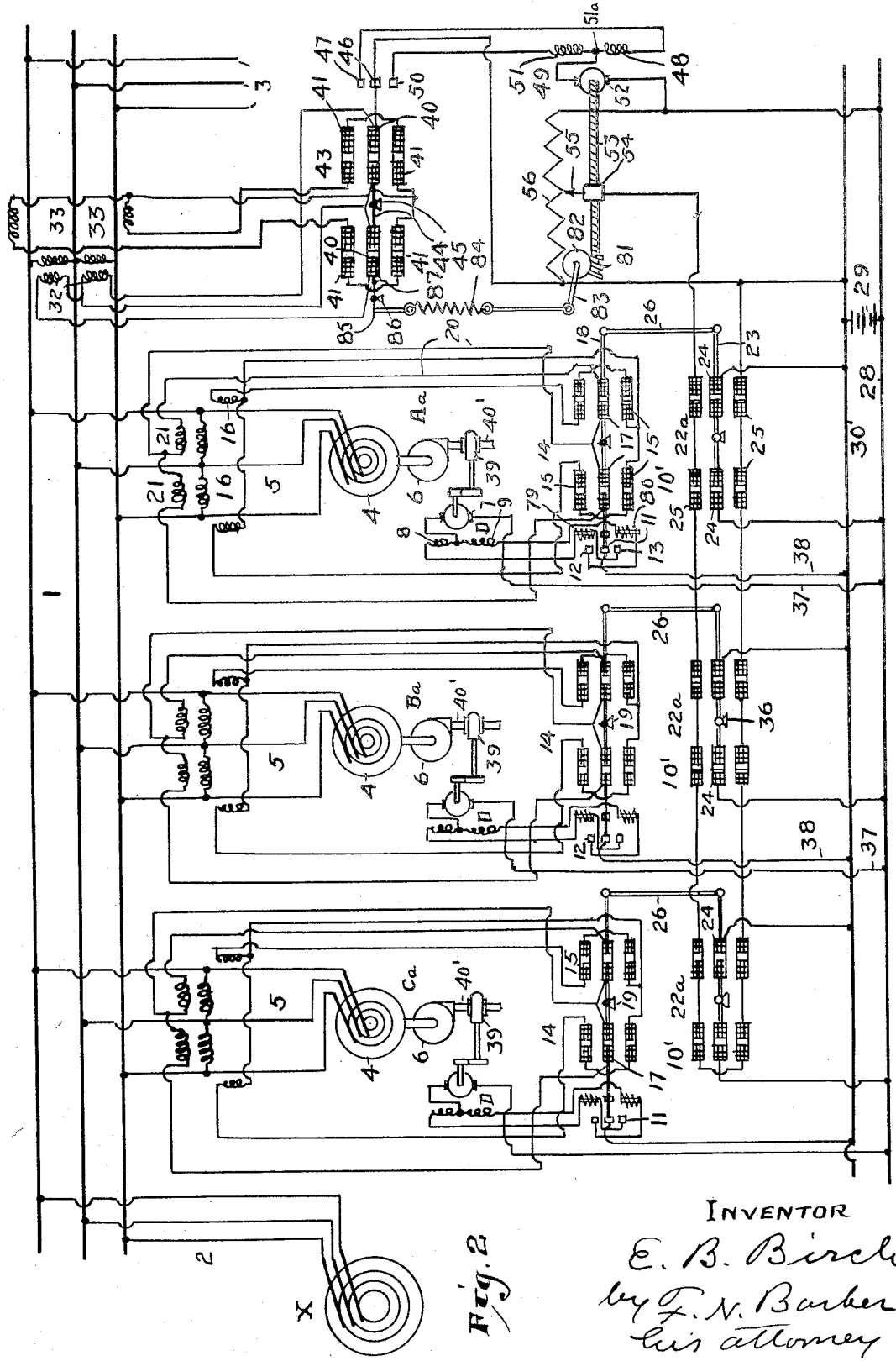

Referring now to Fig. 2, the parts thereof which are the same as in Fig. 1 are designated by the same reference characters. The transformers 32 and 33 are connected respectively with the movable and stationary windings 40 and 41 of the balance 43, whose movable member 44 has the fulcrum 45, and carries the contact 46 which engages in one position with the fixed contact 47 in circuit with the field winding 48 of the control motor 49, and in another position with the fixed contact 50 in circuit with the field winding 51. The fields are connected together at the point 51$^a$ which is connected to one pole of the armature 52, the other pole being connected to the wire 28. The armature 52 rotates the screw 53 which feeds the nut 54 carrying the contact 55 slidable on the resistance 56. The ends of the resistance are connected to the wires 28 and 30. The windings 25 of the balances 22$^a$ are all in series, one terminal being connected to one end of the resistance and the other terminal to the contact 55. The movable coils 24 are connected to the wires 28 and 30, and the contact 46 is connected to the wire 30. The screw 53 carries a worm 81 geared to the worm-wheel 82 which operates the arm or shaft 83 so as to increase or decrease the tension of the spring 84 pulling down on the lever 85 fulcrumed between its ends as shown at 86 and pivotally connected to the member 44 at 87. 81 and 82 indicate merely a driving connection without any attempt to show the required gear ratio which will vary with the particular results desired. The connection between the motor armature 52 and the screw 53 is shown as direct but the ratio of the speeds between the two will be arranged to suit the requirements.

The pulls of the balances 14 are upwards on the links 26 while the pulls of the balances 22$^a$ are downwards thereon. When the service lines 3 are taking no more current than the normal predetermined amount designed to be supplied by the lines 2, the contacts 11 are not in engagement with their fixed contacts, and the contact 55 occupies a central position on the resistance 56. If the load on the service lines 3 is increased, the increased current from the lines 2 increases the energization of the transformers 32 and 33, and, consequently, of the windings 40 and 41 of the balance 43, thereby causing the contact 46 to engage the contact 47. Current through these contacts energizes the armature 52 and the field 48 which causes the contact 55 to travel along the resistance 56. The change of current in the windings 25 causes the balances 22$^a$ to increase their down-pulls, which causes the contacts 11 to engage the contacts 12, whereby current is supplied to the field windings 9 to cause the motor 7 to control the steam to the turbines 6 as described with respect to Fig. 1. The generator units A$^a$, B$^a$, and C$^a$ are controlled by the contacts 11 the same as the units A, B, and C of Fig. 1 are controlled by their contacts 11. When the generators 4 impress on the system the difference between the total current supplied to the lines and the normal current from the lines 2, the balances 14 pull the contacts 11 away from the contacts 12, and the generators 4 run at constant output. As the screw shaft 53 rotates, the gears 81 and 82 cause a continually increasing pull on the spring 84, which produces a continually increasing force through the lever 85 and the balance member 44 tending to open the contacts 46 and 47. The spring 84 is at such a tension, when the generators 4 supply the demands of the lines 3 above the predetermined supply from the source X, that it causes the contacts 46 and 47 to open. This causes the motor 49 to stop and prevents further change of current in the windings 25, leaving the motors D to be controlled by the control mechanisms 10' as herein described.

Supposing the source X is to supply 10,000 kilowatts to the bus-bars 1 and that the lines 3 demand 15,000 kilowatts, the balance 43 and the regulating devices 10' will operate in the manner already described. The generator units $A^a$, $B^a$, $C^a$, will be caused to feed into the bus-bars 1 5,000 kilowatts, at which time the contacts 11 and 12 will be opened preventing further increase of output from the generators 4. The spring 84 and the ratio of travel of the gears 81 and 82 are such that when 15,000 kilowatts are passing to the lines 3, the contacts 46 and 47 will be opened by the pull of the spring 84.

When the service lines take less current than the said difference, the balance 43 is operated to cause the contact 46 to engage the contact 50. Thereupon the motor 49 becomes energized with the reversing field 51 in circuit. The motor then rotates to cause the screw to return the contact 55, thereby changing the current in the balances $22^a$ so as to weaken their down-pulls on the links 26 and allow the up-pulls by the balances to move the contacts 11 into engagement with the contacts 13, whereby the speed of the turbines 6 is lessened as before described in connection with Fig. 1. The worm gears 81 and 82 will at the same time cause the tension of the spring 84 to be weakened so that when the current through the bus-bars 1 reaches 10,000 kilowatts, the balance 43 can and will at once open the contacts 46 and 50 and prevent further change of current in the windings 25 and further change of tension of the spring 84.

Figure 3:
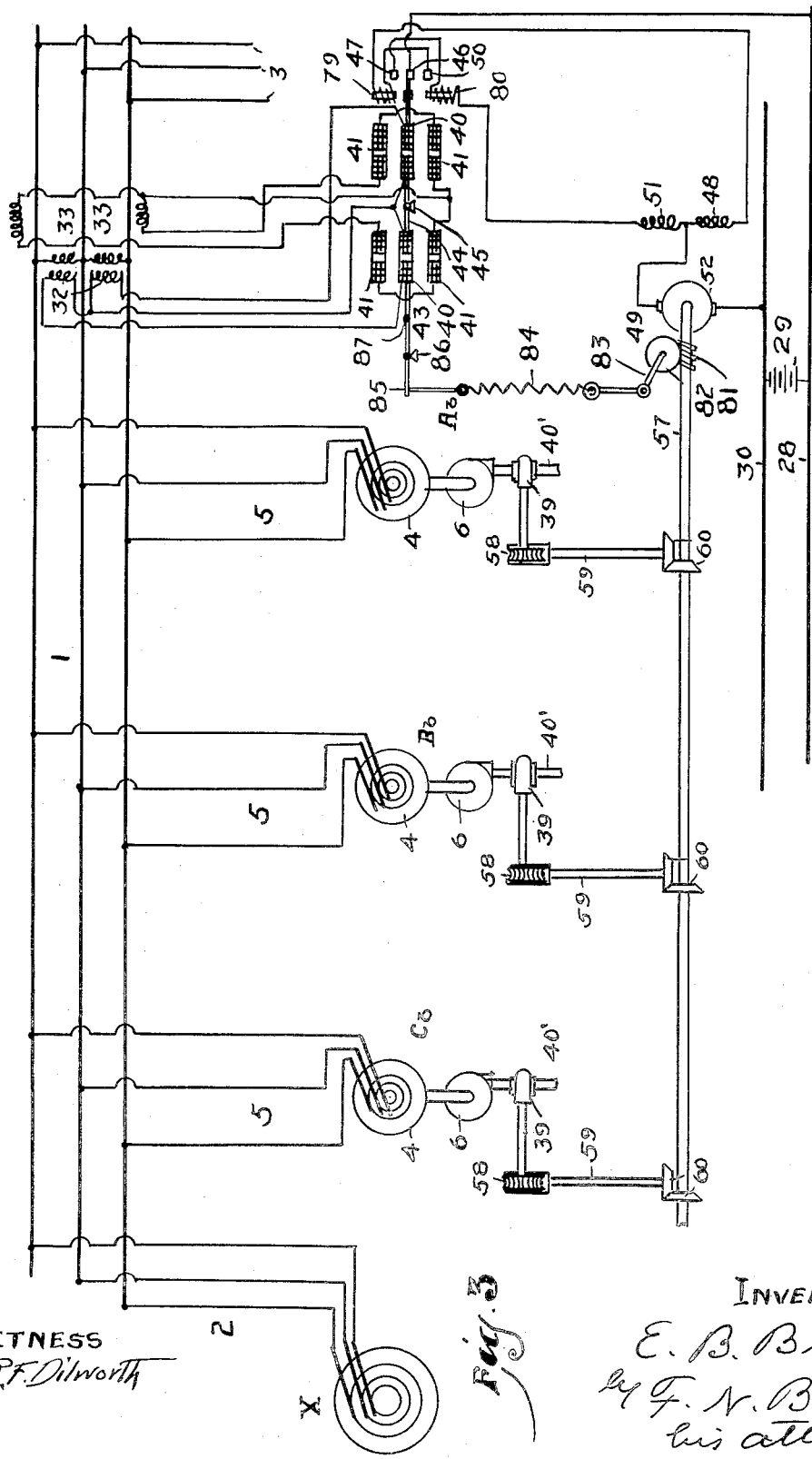

In Fig. 3, I employ the balance 43 and the regulating motor 49 as in Fig. 2, but I do not employ any of the other balances used in Figs. 1 and 2. The armature 52 instead of rotating a screw as in Fig. 2, rotates the line shaft 57. The generator units $A^b$, $B^b$, $C^b$ have the generators 4 connected to the steam turbines 6, whose throttle valves 39 are each controlled in any suitable manner by worm wheels 58 driven from the shafts 59 connected to the line shaft 57 by pairs of bevel gears 60. The shaft 57 will rotate in one direction or the other under the same conditions as the screw 53 in Fig. 2. When more current is required by the service lines the shaft 57 will be rotated so as to cause more steam to be admitted to the turbines 6; and when less current is required the shaft 57 will be rotated in the reverse direction in order to cut down the steam supply to the turbines. The balance 43 is controlled by the spring 84, and the anti-hunting magnets 79 and 80 as already described in Fig. 2.

Figure 4:
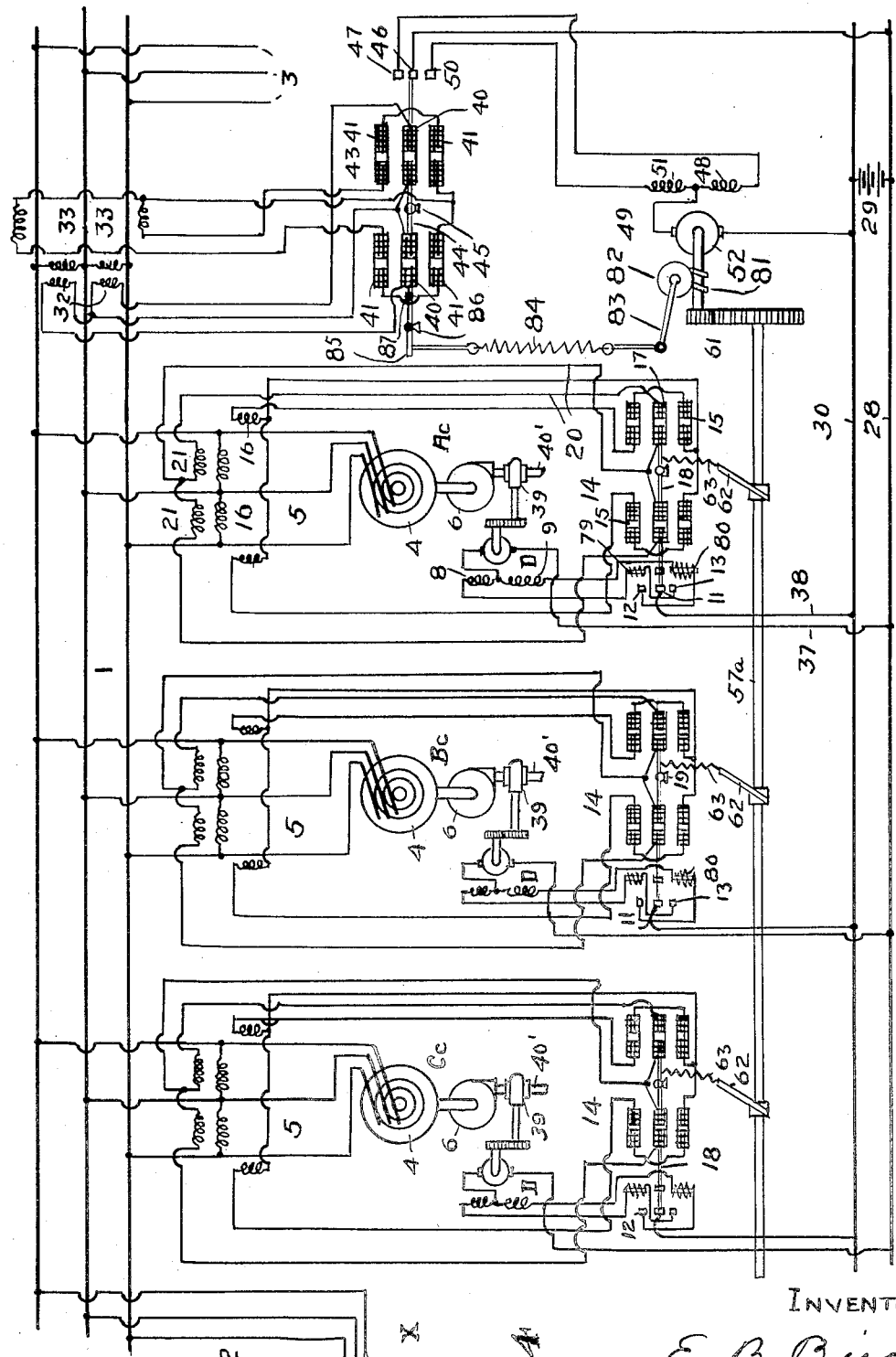

Referring now to Fig. 4, I employ the balances 14 as in Fig. 1, and the balance 43 and the motor 49 as in Figs. 2 and 3. As in Fig. 3 the motor 49 drives a shaft, but in Fig. 4 this shaft, marked $57^a$, is driven through reduction gears 61, and has the arms 62 connected by the springs 63 to exert down-pulls on those ends of the movable members 18 which are on the opposite sides of the fulcrums 19 from the contacts 11. When the generator units $A^c$, $B^c$, and $C^c$ are supplying to the service lines the difference between the normal current supplied by the main generator X and the current drawn by the service lines 3, the contacts 11 and 46 are out of engagement with their fixed contacts, and the generators 4 are running at constant output. When the load on the service lines 3 increases, the shaft $57^a$ will be rotated so as to cause the springs 63 to become stretched. Thereupon the members 18 of the balances are moved to cause the contacts 11 to engage the contacts 12. This causes the prime movers 6 to increase the output of the generators 4 in the manner hereinbefore explained. When the generators 4 feed into the service lines current sufficient to reduce the current supplied by the lines 2 to their normal or predetermined value, the current impressed by the generators 4 causes the movable members of the balances 14 to act in opposition to the springs 63 and open the contacts 11 and 12. When the demands of the service lines slacken, the balance 43 closes the contacts 46 and 50, and the shaft $57^a$ is rotated so as to reduce the tension on the springs 63, which allows the normal operation of the balance 14 to close the contacts 11 and 13, which, in a manner already explained, causes the generators 4 to reduce their output to balance the said difference between normal supply from the generator X and the total current taken by the service lines 3. The balance 43 is controlled by the spring 84, and the anti-hunting magnets 79 and 80 as already described in Fig. 2.

Figure 5:
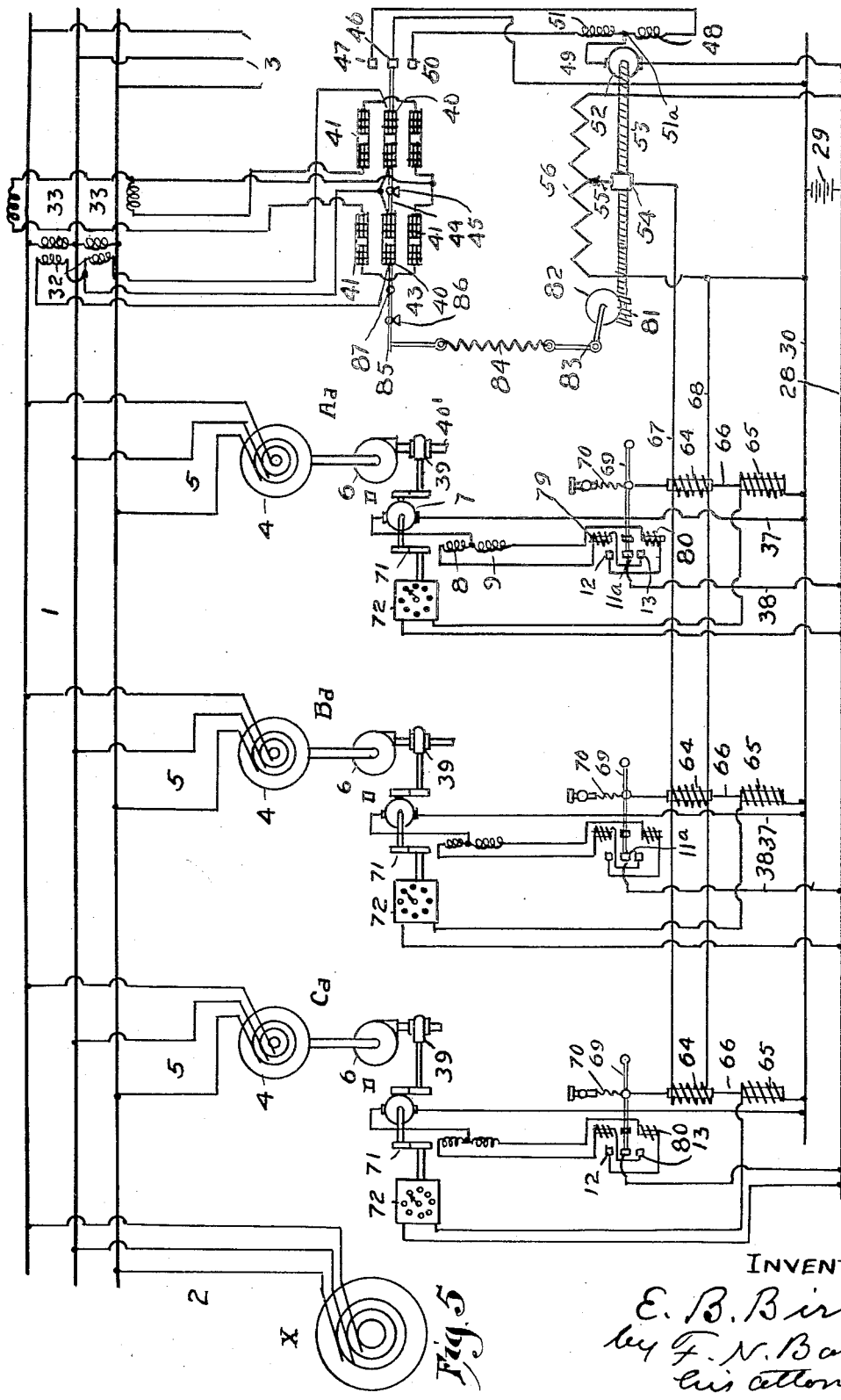

Referring now to Fig. 5, the generator units $A^d$, $B^d$, and $C^d$ are not associated directly with any balances, but the balance 43, the motor 49, and the resistance regulation bearing numerals 53 to 56 are substantially the same as in Fig. 2. The motors D of Fig. 1 are retained. The generator units each have a pair of vertically-alined solenoids 64 and 65 connected together by the rod 66.

The upper solenoid-winding is placed in parallel across the wires 67 and 68, which correspond to the wires which contain the windings 25 in Fig. 2. The core of the upper solenoid carries the switch member 69 bearing the contact 11ª arranged to engage the fixed contacts 12 or 13 leading to the fields of the motors D as in Figs. 1, 2, and 3. The springs 70 exert up-pulls on the members 69 which are balanced by the down-pulls of the solenoids 64 and 65 when the generators 4 are supplying the difference between the current taken by the supply lines 3 and the normal supply from the lines 2. When the load on the service lines increases, the screw 53 will be operated as in Fig. 2, whereupon the current in the wires 67 and 68 is decreased so as to allow the springs 70 to make the contacts 11ª engage the contacts 12. The motors D will be rotated, as in Figs. 1, 2, and 4, to increase the output of the local generators until it reaches the said difference of current supply. As the motors D rotate, they operate through sets of gears 71 the rheostats 72 which reduce the resistance in the circuits of the solenoids 65, so that the down-pulls of these solenoids increase and cause the contacts 11ª to be drawn away from the contacts 12. At this time, the generators will run at constant speed. In case the current used in the lines 3 falls off, the balance 43 will close the contacts 46 and 50, and through the motor 49 and the resistance 56 cause the resistance in the circuits of the solenoids 64 to decrease, thereby increasing the current in the windings of the solenoids 64, which pull the contacts 11ª into engagement with the contacts 13. Then the motors D will be revolved so as to cause the speed of the generators 4 to be reduced. At the same time the rheostats 72 are rotated to increase the resistance in the circuit through the solenoids 65, so that, when the generators 4 again impress on the service lines the required current, the springs 70 will cause the separation of the contacts 11ª and 13. The generators 4 will then run at constant output until the service lines again alter their demands for more or less current. The balance 43 is controlled by the spring 84, and the anti-hunting magnets 79 and 80 as already described in Fig. 2.

Figure 6:
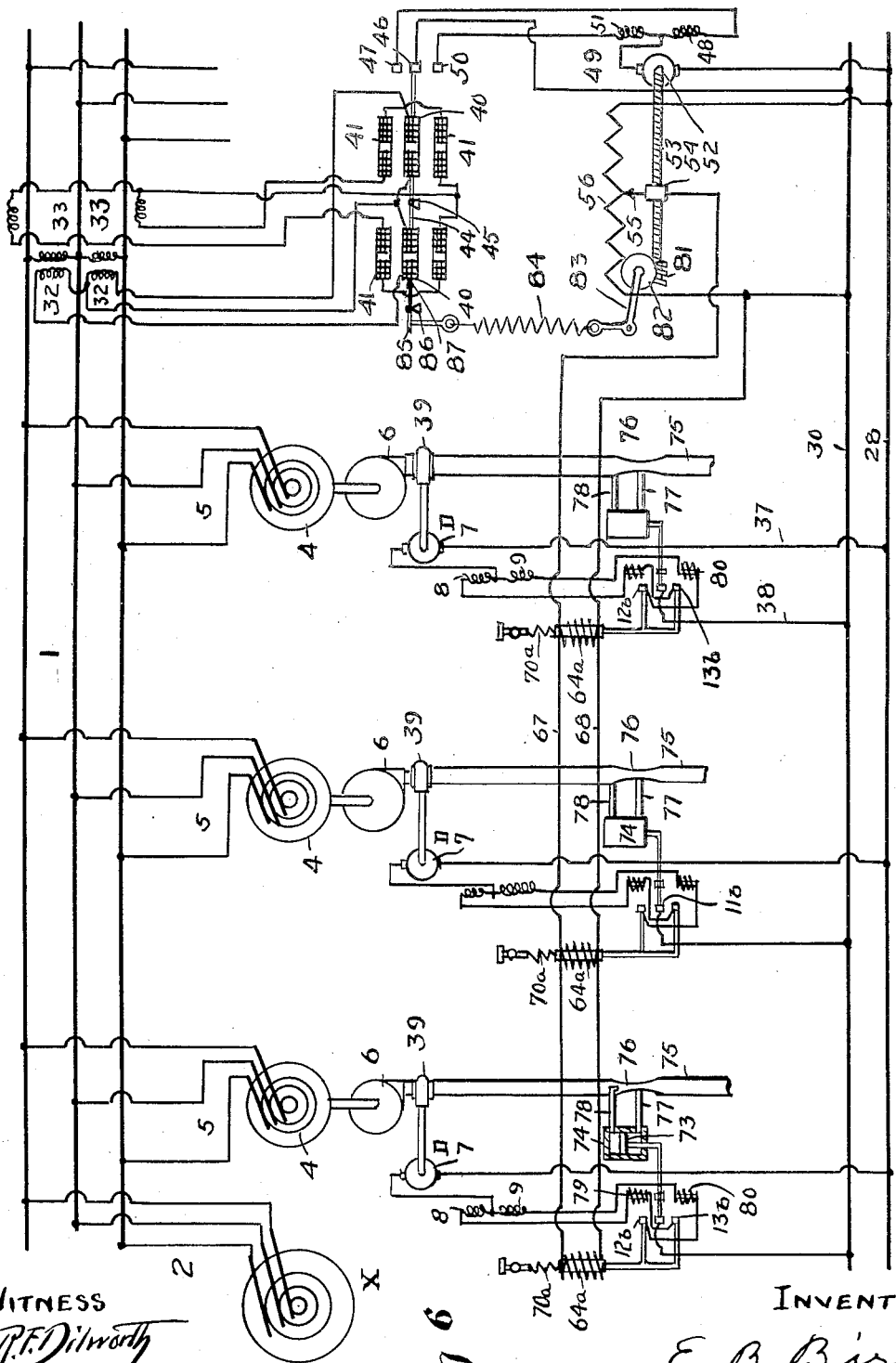

On Fig. 6, the parts are the same as on Fig. 5 except that in Fig. 6 the solenoids 65 have been omitted and the steam pressure has been utilized to control the motors D. The cores of the solenoids 64ª are suspended by the springs 70ª and support the spaced contacts 12$^b$ and 13$^b$, between each pair of which is the contact 11$^b$, carried by the piston or plunger 73 working in the cylinder 74. 75 represents the steam pipe for conveying steam to each turbine 6. Opposite each cylinder 74, each pipe 75 has a contracted interior or venturi portion 76. From the narrower part of the portions 76, pipes 77 lead to the cylinders 74 below the pistons 73 and from the widened portions of the pipes 75 just above the portions 76, pipes 78 lead to the cylinders above the said pistons. The pipes 78 open downwardly in the pipes 75. The balance 43, the motor 49, the contact 55, and the motors D operate as in Fig. 5. When the output of the generators 4 equals the difference between the predetermined supply from the generator X and the load on the lines 3, the up-pull of the springs 70ª equals the down-pulls on the solenoids 64ª, so that the contacts 11$^b$ are between the contacts 12$^b$ and 13$^b$. When the load on the service lines increases, the resistance 56 in the circuit 67, 68, is decreased, so that more current flows through the solenoids 64ª and causes the solenoid cores to be lowered and the contact 12$^b$ to engage the contact 11$^b$. Current through these contacts energizes the motors D through the fields 9, causing the motors to start and admit more steam to the turbines 4. The increased flow of steam through the pipes 75 causes increased pressures through the pipes 78 (the pressure in the pipes 77 being nearly constant) and upon the tops of the pistons 73, thereby causing the contacts 11$^b$ to be moved away from the contacts 12$^b$, whereupon the generators 4 run at constant output. If their output is not sufficient to establish equilibrium the magnets 64ª will again be lowered to engage the contacts 11$^b$. The generators 4 then increase their output. This action is continued until the generators 4 are feeding the required current into the system. When the demands of the service lines slack off, the balance 43 closes the contacts 46 and 50, thereby causing the motor 49 to reverse the travel of the contact 55 so as to increase the resistance in the magnet circuits and permit the springs 70ª to move the contacts 13$^b$ into engagement with the contacts 11$^b$ to slow down the motors D. As the motors slow down, the pressure of the steam on the tops of the pistons 73 decreases, allowing the practically constant pressure on the lower sides of the piston to move the contacts 11$^b$ away from the contacts 13$^b$. Upon further drops in the lines 3 the same action will be repeated until equilibrium is reached. The balance 43 is controlled by the spring 84, and the anti-hunting magnets 79 and 80 as already described in Fig. 2.

While I have shown the lower balances or their equivalents governed by the total current going to the service lines 3, they may obviously be governed by a part of the said total current, for example, by placing the transformers 32 and 33 or their equivalents in the transmision lines 2, as shown on Fig. 7 which is precisely like Fig. 2 except that the transformers 32 and 33, the balance 43, the motor 49 and the regulating device below it have been placed between the generator X and the generator unit $C^a$. The transformers 32 and 33 are on the lines 2 though they might be, in the particular arrangement of Fig. 2, on the bus-bars 1 to the left of the lines 5 of the unit $C^a$. In Fig. 7, the balance 43 is controlled by the output of the main generator X rather than by the combined output of main and auxiliary units. In Fig. 7 I show the balance 43 controlled by the spring 27' whose tension is adjusted by the screw 31'. The spring 27', as is the case of the springs 27 of Fig. 1, has its tension adjusted to move the contact 46 away from the contact 47 or 50, as the case may be, when the output of the generator X is at the predetermined rate. The principal essential difference between Figs. 2 and 7 is that the transformers have been transferred from the bus-bars 1 to the main generator leads 2. Evidently the transformers of Figs. 3, 4, 5, and 6 could be similarly transferred, if desired.

If any of the generators should take more than its share of the load, its regulating means will operate in an evident manner to restrain it without affecting the other generators.

I claim:

1. In an electric distribution system, service lines, main and auxiliary means for supplying current to said lines, means controlled by the total load on the said lines for varying the output of the said auxiliary means, and means controlled by the output of the auxiliary means for controlling the varying means.

2. In an electric distribution system, service lines, main and auxiliary means for supplying current to said lines, means whereby the output of the said auxiliary means is regulated by the difference between a predetermined value of current to be taken from the said main means and the total load on the service lines, and means controlled by the output of the auxiliary means for controlling the regulating means.

3. In an electric distribution system, service lines, main and auxiliary means for supplying current to said lines, means whereby the output of the said auxiliary means is varied so as to be substantially equal to the difference between a predetermined value of current to be taken from the said main means and the total load on the service lines, and means controlled by the output of the auxiliary means for controlling the varying means.

4. In an electric distribution system, service lines, a main source of current supply, and a plurality of auxiliary sources of current supply for the said lines, means controlled by the total load on the said lines for varying the output of the auxiliary sources, and means controlled by the output of each auxiliary source for controlling its varying means.

5. In an electric distribution system, service lines, a main source of current supply, and a plurality of auxiliary sources of current supply for the said lines, means controlled by the total load on the said lines for varying the output of the auxiliary sources, and means for controlling the distribution of the said output among the several auxiliary sources.

6. In an electric distribution system, service lines, a main source and auxiliary sources for supplying current to said lines, and means whereby the output of the said auxiliary sources is varied so as to be substantially equal to the difference between a predetermined value of current to be taken from the said main source and the total load on the service lines, in combination with means for controlling the distribution of the said output among the several auxiliary sources.

7. In an electric distribution system, service lines, a main source, and auxiliary sources for supplying current to said lines, and means whereby the output of the said auxiliary sources is regulated by the difference between a predetermined value of current to be taken from the said main source and the total load on the service lines, in combination with means for varying the proportions of the said output supplied by the several auxiliary sources.

8. In an electric distribution system, a main source, and auxiliary sources of current supply, service lines connected to the said sources, means for governing the output of the auxiliary sources in accordance with the value of current flowing from the main source, and means for controlling the proportions of the output supplied by the several auxiliary sources.

9. In an electric distribution system, service lines, a main source, and auxiliary sources of current supply for said lines, means governing the output of the auxiliary sources so as to maintain the current delivered by the main source substantially constant, and means for controlling the distribution of the said output among the auxiliary sources.

10. In an electric distribution system, service lines, a main source and an auxiliary source of current supply for the said lines, means controlled by current taken by the service lines for varying the output of the auxiliary source, and means controlled by the output of the auxiliary source for stopping the variations.

11. In an electric distribution system, service lines, a main source and an auxiliary source of current supply for the said lines, means controlled by current taken by the service lines for varying the output of the auxiliary source, and means controlled by the output of the auxiliary source for stopping the variations and checking any reverse variations.

12. In an electric distribution system, service lines, a main source and an auxiliary source for supplying current to said lines, and means controlled by the total load on the said lines for varying the output of the said auxiliary source, in combination with means controlled by the auxiliary source for stopping the variations when the output of the auxiliary source equals the difference between a predetermined demand on the main source and the total load on the service lines.

13. In an electric distribution system, service lines, main and auxiliary means for supplying current to said lines, and means controlled by the total load on the said lines for varying the output of the said auxiliary means, the said controlling means containing a pair of contacts and a third contact engageable with one or the other of the first two contacts to increase or decrease the said output, electromagnetic means for operating the third contact, means controlled by the output of the auxiliary means for controlling the varying means, and an anti-hunting device for the third contact.

14. In an electric distribution system, main and auxiliary sources of current supply, means for causing the auxiliary source to supply varying current demands in excess of a predetermined current demand on the system, the said means including a contact adapted to engage a second contact for increasing the output of the auxiliary source and to engage a third contact for decreasing the said output, means controlled by the output of the auxiliary means for controlling the first means and means assisting the normal contact-opening means.

15. In an electric distribution system, a consumption circuit, a main and an auxiliary source of current supply for the same, and means for causing the auxiliary source to supply varying current demands in excess of a predetermined current demand on the system, the said means including a movable switch member having alternate contacts for increasing and decreasing the output of the auxiliary source and magnetic means controlled by current conditions in the said circuit and by the output of the auxiliary source and tending to open the said switch member when the auxiliary source equals said excess current demands, all in combination with means for advancing the time of opening the switch member to prevent hunting by the said switch member.

16. In an electric distribution system, a consumption circuit, a main and an auxiliary source of current supply for the circuit, means controlled by the current for varying the output of the auxiliary source to compensate for the difference between the amount of current consumed in said circuit and a predetermined amount of current to be taken from the main source, and means controlled by the output of the auxiliary source for making the output thereof constant when their output is substantially equal to the said difference.

17. In an electric distribution system, service lines, main and auxiliary means for supplying current to said lines, means controlled by the total load on the said lines for varying the output of the said auxiliary means, means controlled by the output of the auxiliary means for controlling the varying means, and means for preventing hunting.

18. In an electric distribution system, service lines, main and auxiliary means for supplying current to said lines, means whereby the output of the said auxiliary means is regulated by the difference between a predetermined value of current to be taken from the said main means and the total load on the service lines, and means for preventing hunting.

19. In an electric distribution system, service lines, main and auxiliary means for supplying current to said lines, means whereby the output of the said auxiliary means is regulated by the difference between a predetermined value of current to be taken from the said main means and the total load on the service lines, means controlled by the output of the auxiliary means for controlling the varying means, and means for preventing hunting.

20. In an electric distribution system, service lines, main and auxiliary means for supplying current to said lines, means whereby the output of the said auxiliary means is varied so as to be substantially equal to the difference between a predetermined value of current to be taken from the said main means and the total load on the service lines, and means for preventing hunting.

21. In an electric distribution system, service lines, main and auxiliary means for supplying current to said lines, means whereby the output of the said auxiliary means is varied so as to be substantially equal to the difference between a predetermined value of current to be taken from the said main means and the total load on the service lines, means controlled by the output of the auxiliary means for controlling the first means, and means for preventing hunting.

22. In an electric distribution system, service lines, a main source and an auxiliary source of current supply for the said lines, means controlled by the total load on the said lines for varying the output of the auxiliary source, means controlled by the output of the auxiliary means for controlling the varying means, and means for preventing hunting.

23. In an electric distribution system, service lines, a main source of current supply, and a plurality of auxiliary source of current supply for the said lines, means controlled by the total load on the said lines for varying the output of the auxiliary sources, means for controlling the distribution of the said output among the several auxiliary sources, and means for preventing hunting.

Signed at Pittsburgh, Pa., this 22nd day of June, A. D. 1921.

EZEKIEL B. BIRCH.